United States Patent [19]

Carlier

[11] Patent Number: 4,661,026
[45] Date of Patent: Apr. 28, 1987

[54] PNEUMATIC SEND/RECEIVE TERMINAL

[75] Inventor: Claude Carlier, Montreuil, France

[73] Assignee: Lamson Corporation, Syracuse, N.Y.

[21] Appl. No.: 829,629

[22] Filed: Feb. 14, 1986

[51] Int. Cl.$^4$ ............................................. B65G 51/26
[52] U.S. Cl. ...................................... 406/74; 406/112
[58] Field of Search ............................... 406/110–112, 406/147–150, 176–180, 74

[56] References Cited

U.S. PATENT DOCUMENTS 3,706,428  12/1972  Carlier .................................. 406/110

FOREIGN PATENT DOCUMENTS

2420459  10/1975  Fed. Rep. of Germany ...... 406/112
1333596  10/1973  United Kingdom ................ 406/112

Primary Examiner—Jeffery V. Nase
Attorney, Agent, or Firm—Bruns and Wall

[57] ABSTRACT

A pneumatic tube send/receive terminal has a dispatch carrier that is movable between a load position and a send position. A sprocket chain fits on two sprockets and rotates under motor power, and a cam is mounted on the chain. A clapper valve or cover is hinged to a trolley or carriage that also rotatably holds the dispatch holder. A block or cog attached to the chain connects to the dispatch holder, and this rotates the same 180 degrees and then moves the trolley and the dispatch holder laterally to the send position. The cam rides a camway on the valve, and normally holds it shut, but when the chain is moved, the cam rotates over the camway and releases the valve so that it opens, and any received pneumatic carrier drops out. Rotation of the dispatch holder 180 degrees prevents inadvertent accessing the pneumatic tube with a second carrier in a single send operation.

11 Claims, 6 Drawing Figures

PNEUMATIC SEND/RECEIVE TERMINAL

BACKGROUND OF THE INVENTION

This invention relates to a pneumatic tube transfer system, and is more particularly directed to a dispatch terminal or station for the delivery, reception, and/or transit of the cylindrical carrier or vehicle employed in such a system.

In an ideal pneumatic system, the dispatch terminals should make it simple and convenient to transmit a carrier to a desired remote station, and, at the same time facilitate a low impact reception of pneumatic carriers.

In previously proposed dispatch stations, such as those described in U.S. Pat. Nos. 4,437,797; 4,459,069; and 4,047,677, a pneumatic carrier or vehicle is loaded into a tubular chamber in the chamber's load position, and then the chamber, with carrier in it, is moved to a transmit position aligned with a pneumatic tube. In this type of system, a carrier must be inserted endwise through a hole in the terminal housing for access to the chamber, and it is difficult or impossible to retrieve a received carrier at the same time that one transmits a carrier to a remote station. Furthermore, the operation of these stations is rather complex.

Open-type carrier terminals are sometimes employed, these terminals being of simpler construction, and somewhat easier to utilize for send and receive functions. However, if the open type of pneumatic transmit or receive terminal is employed, there is a danger that an operator could inadvertently load two carriers into the terminal at one time, causing a system misoperation.

By way of background, and for the reader's edification and information, a pneumatic carrier system can employ various types of line equipment, including diverters and switches, as discussed, for example, in U.S. Pat. Nos. 4,466,761; 4,516,888; 3,174,806; and 3,902,682.

OBJECTS AND SUMMARY OF THE INVENTION

It is an object of this invention to provide a pneumatic send/receive terminal which avoids the drawbacks of the prior art.

It is a more particular object of this invention to provide a pneumatic send/receive terminal which is simple in design and operation, and which reliably safeguards against inadvertent double loading of pneumatic carriers to be transmitted and provides a low impact deceleration of carrier speed to zero.

In accordance with an aspect of this invention, a send and receive terminal for a pneumatic tube system is employed for the transmission and reception of generally cylindrical carriers that are transferred under air pressure, through a carrier tube, to or from another terminal in the system. In the terminal, a housing has an end member with a tubular guide member that opens to an end of the carrier tube, a receive bin for holding received carriers which have been transmitted from a distant terminal, and a frame supporting the end member and the receive bin, the frame having an access opening at the one side and a closed wall at an opposite side.

A dispatch holder, in which a carrier to be transmitted is loaded, has an open side for insertion of one of the carrier, and an open end for communicating with the tubular guide member. A clapper valve, i.e., a hinged door, or other suitable closure means, closes the tubular guide member but is openable to release the received carrier or to insert a carrier to be transmitted into the tubular guide member.

A trolley or carriage in the housing end member travels over a horizontal span and carries the dispatch holder and the clapper valve or other closure means between a first position in which the closure means is aligned with the tubular guide member and the dispatch holder is offset from the guide member to the open side of the housing, and a second position in which the closure means is offset from the tubular guide member and the dispatch member is moved into alignment with the tubular guide member at the closed-wall section of the housing.

A chain drive system is coupled with the clapper valve or other closure means, the dispatch holder, and the carriage. The chain drive system serves for displacing the carriage, for opening and closing the clapper valve, and for rotating the dispatch holder. When the carriage is in its first position, the chain drive system rotates the dispatch holder to orient its open side away from the access opening and opens the clapper valve, and then displaces the carriage with the opened clapper valve and the rotated dispatch holder to the second position.

When the clapper valve is open, any received carrier will drop or be ejected out from the pneumatic tube and tubular guide member into the receive bin, and when the dispatch holder is aligned with the tubular guide member, any carrier that is loaded into the dispatch holder is in position to be transmitted through the pneumatic system.

After any transmission, the drive chain is operative to return the carriage to the first position, to close the clapper valve and to rotate the dispatch holder to orient its open side towards the access opening so that it is ready to be loaded with another pneumatic carrier.

A micro-processor control, which can include a keyboard control panel, is mounted on the housing, and permits the operator to selectively control the chain drive and the pneumatic tube system for effecting the transfer of a carrier loaded on dispatch holder to another terminal in the system, or simply to open the clapper valve to release a received carrier. In the preferred embodiment, the pneumatic tube is connected from above to the terminal, and the chain drive includes a drive sprocket disposed at the position of the dispatch holder in its first position, and another, driven sprocket with an open center and position over the tubular guide member. The dispatch holder is rotationally mounted on the carriage, but is fixed relative to a particular length of the drive chain, so that the chain acts to rotate and then displace the dispatch holder as the chain travels around the sprockets.

A cam member is also mounted on the drive chain and this cam member rides on a camway or cam follower member on the clapper valve to control the closing and opening of the clapper valve with the movement of the drive chain.

The above and many other objects, features, and advantages of this invention will be more fully understood from the ensuing detailed description of the preferred embodiment, which is given for purposes of example and not limitation, and which should be considered in connection with the accompanying drawing.

DETAILED DESCRIPTION OF THE PREFERRED EMBODIMENT

Figure 1:
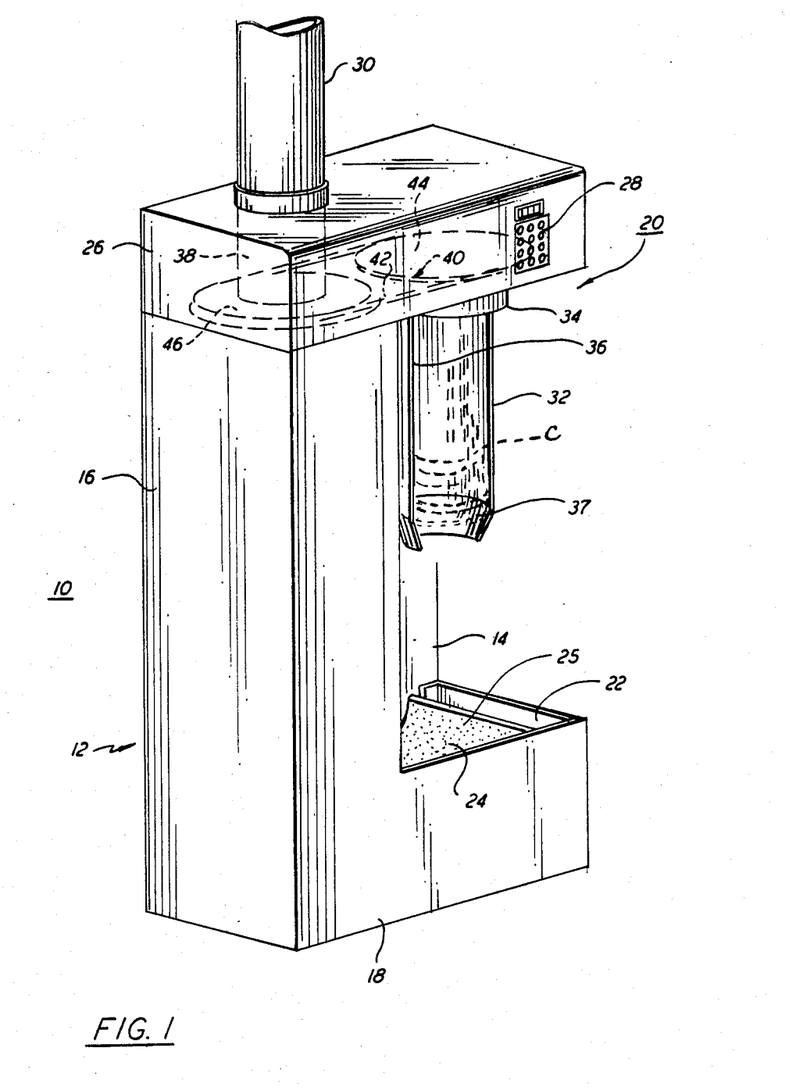
Fig. 1 is a perspective view of the pneumatic send-/receive terminal of the preferred embodiment of this invention.

With reference to the drawing, and initially to FIG. 1 thereof, a pneumatic send/receive station or terminal 10 is shown to have a housing 12 comprised of a back wall 14, a left side wall 16, an L-shaped front wall 18 which leaves an access opening 20, and a right side wall 22 which extends to the access opening 20. The walls 14, 16, and 18 constitute a shroud over the left or pneumatic tube side of the housing 12. Although not shown in this embodiment, the access opening 20 can be provided with a door or cover, preferably of a transparent plastic material. The lower part of the terminal 10 enclosed within the housing 12 constitutes a receive bin 24, here provided with a curved liner 25. A top end or roof 26 of the housing 12 includes a control panel keyboard 28 for entering transmission data. A pneumatic tube 30, for receiving incoming carriers and transmitting outgoing carriers enters the roof 26 from above and is disposed near the closed-wall portion thereof, i.e., near the side wall 16. A dispatch holder 32, shown here with a carrier C in dispatch or send position, is generally of cylindrical form, and is open at the front for loading of the carrier C to be transmitted. The dispatch holder 32 has a tubular top 34 and a sheath 36 which encircles the back, but leaves an open front 37.

As shown in ghost lines here, a send/receive mechanism for the terminal 10 includes a tubular guide member 38 which is aligned with and connected to the tube 30, and a chain drive 40 constituted by a drive chain 42, a drive sprocket 44 which is at the illustrated position of the dispatch carrier 32, and an open-center driven sprocket 46 which is coaxially mounted over the tubular guide member 38. These elements, together with the remaining parts of the send/receive mechanism of the terminal 10, are illustrated in more detail in FIGS. 2, 3A, 3B, 3C, and 4.

A clapper valve 50, (FIG. 2), serves as a door or closure for the tubular guide member 38. The clapper valve is generally D-shaped with a hinge 52 along its flat side. A ramp or camway 54 is provided along the under edge of the valve 50 as a track with a straight ramp section 56 and a semi-cicular section 58. A one-way flap 60 of rubber or similar material is provided on the upper side of the clapper valve 50 which opens to admit air when there is vacuum in the tube 30, and remains closed to provide an air cushion for received carriers C.

Figure 2:
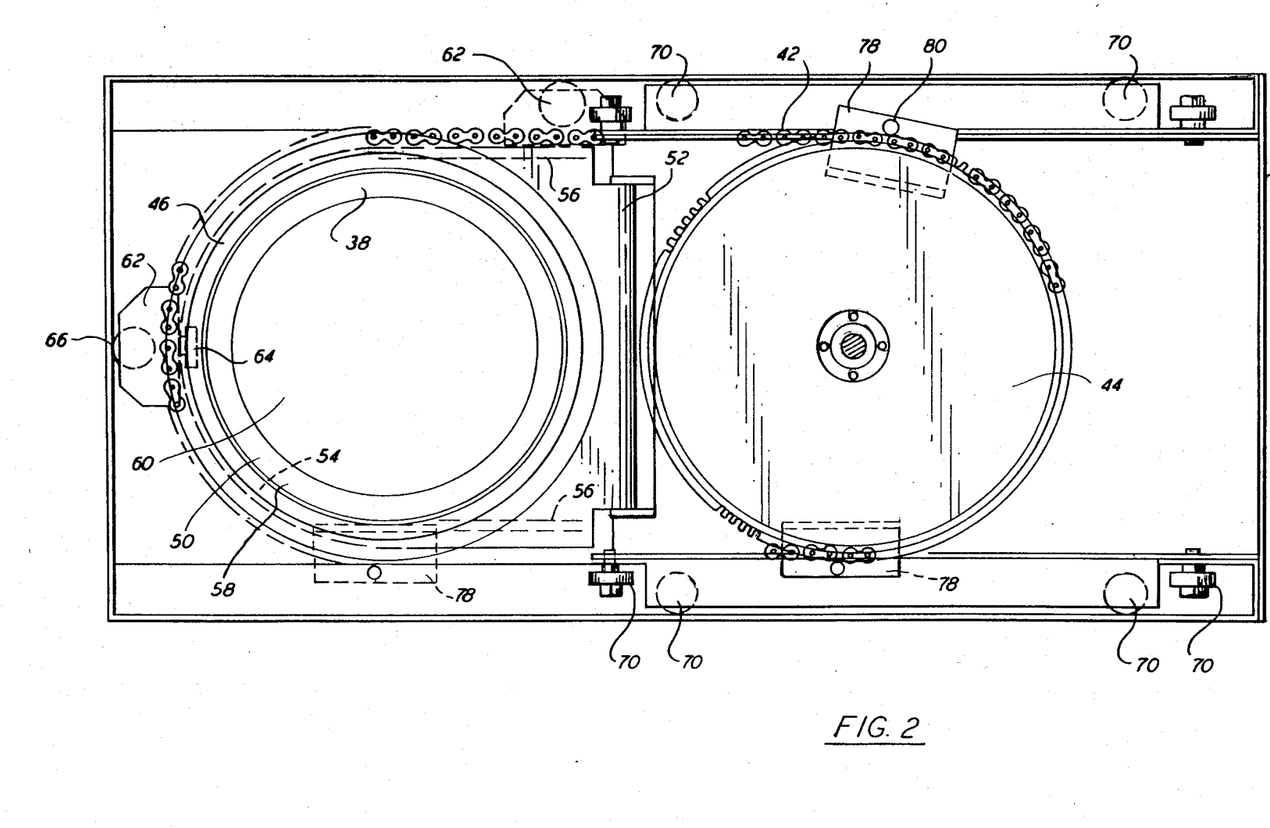
FIG. 2 is a top sectional plan view of the chain drive mechanism of this embodiment FIGS. 3A, 3B.and 3C are side sectional elevations of this embodiment with the elements thereof in a load position, with the clapper valve thereof opened to eject a received carrier, and with the dispatch holder moved to a transmit position, respectively.

A cam assembly 62 is mounted on a link of the chain 42, and has a cam wheel 64 which rides on the cam follower 54 and a spacer wheel 66 which travels relative to the wall of the roof member 26.

A carriage 68 has wheels or rollers 70 which permit travel thereof within the roof member 26 on a track 72 in the roof member 26. A connecting member 74, here shown as a vertical spacer, connects to the hinge 52 of the clapper valve 50. A plurality of bearings 76 are journalled in an annular groove 77 on the tubular top 34 of the dispatch holder 32. This structure permits the dispatch holder 32 to be rotated relative to the carriage 68, and to be affixed thereto with respect to linear movement.

A flange 78 at one side of the dispatch holder 32 is coupled by means of a post 80 to one of the links of the drive chain 42.

To complete the structure, a mounting frame 82 in the roof member 26 mounts the drive sprocket 44 and the tubular guide member 38, and a drive motor 84 is journalled in a bearing 86 mounted on the mounting frame 82 for driving the sprocket 44.

The operation of pneumatic send/receive terminal 10 of this invention can be easily understood from the following.

Figure 3A:
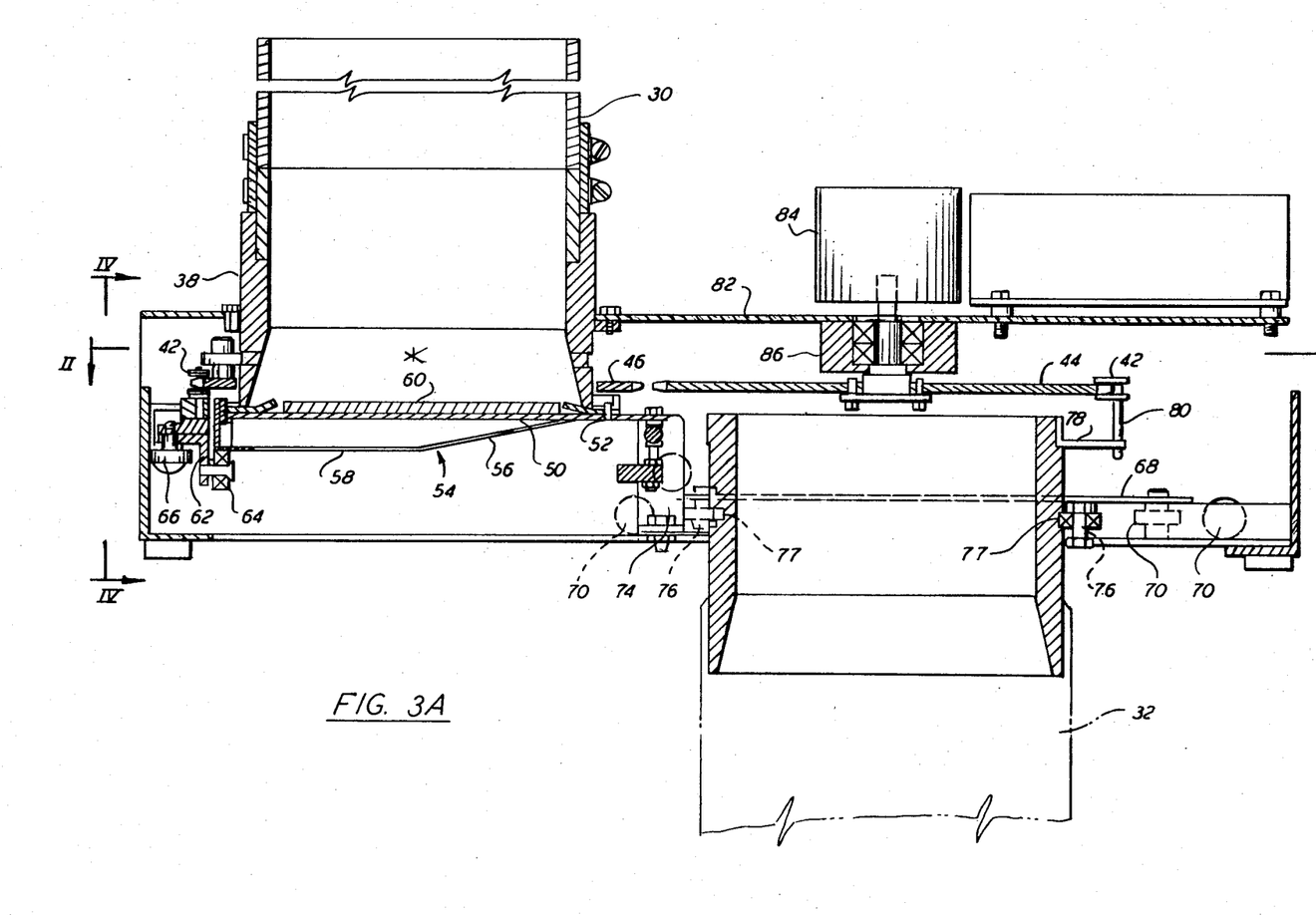
Figure 3B:
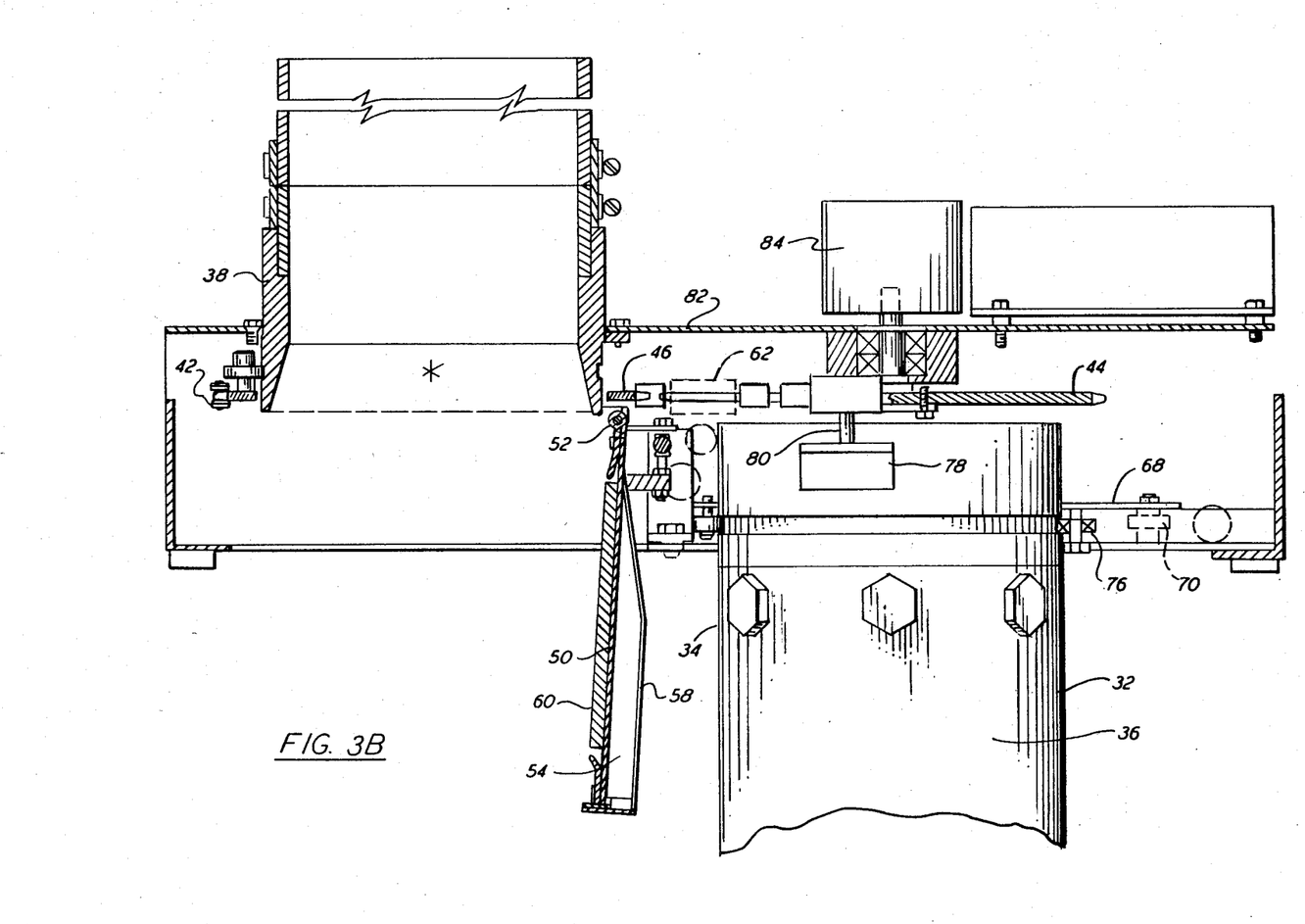

When the terminal 10 is in an idle or ready state, the clapper valve 50 is closed and the dispatch holder 32 is positioned at the access opening 20, with the open front 37 of the dispatch holder 32 oriented forwards, to receive the carrier C to be loaded. This position is shown in FIG. 3A. In this first, or load position, the cam member 62 is disposed at the left-most side of the travel of the chain 42, so that the cam wheel 64 is at the part of the valve 50 remote from the hinge 52. Here, the clapper valve 50 is held securely closed.

When the operator has loaded the carrier C into the dispatch holder 32, the operator presses the appropriate push buttons of the keyboard 28 to enter the intended receive station and the appropriate sequence that corresponds to a transmit command. Then, the motor 84 starts and turns the sprocket 44 which moves the chain 42. The sprocket 44 rotates clockwise as viewed in FIG. 2, and drives the chain to move with the dispatch holder flange 78 in a semi-circle to the position A indicated in ghost. This orients the dispatch holder 32 so that the open side 37 is towards the closed back wall 14, and thus inaccessible to the operator.

At the same time, the movement of the chain 42 causes the cam member 62 and the associated cam wheel 64 to move around the camway 54 and down the sloping ramp 56 thereof to the position shown in ghost. At this point the clapper valve 50 opens, and any received carrier C which may be positioned in the tube 30 drops down into the bin 24. Then the chain 42 continues to move, and the chain 42, the flange 78, and the dispatch holder 32 are moved linearly between the sprockets 44, 46. This motion of the dispatch holder 32 thus moves the carriage, with the post 80 and flange 78 to the position C illustrated in ghost in FIG. 2, and as shown in elevation in FIG. 3C. The open clapper valve 50, which is affixed with respect to the carriage, thus travels to the left in the drawing and out of the way so that the dispatch holder 32 is aligned with the tubular guide member 38. At this point, the dispatch holder 32 is in position for carrier transmission, and a control signal is transmitted from the control keyboard 28 to actuate a blower (not shown) associated with the tube system to create a partial vacuum and draw the carrier C into the tube 30 in a known fashion. After transmission, the chain 42 is moved again to move the carriage 68, together with the clapper valve 50 and the dispatch holder 32, back to the original or load position. The chain continues to move so that the cam wheel 64 rides on the camway 54 to close the clapper valve 50, and so that the flange 78 rotates around the sprocket 44 to orient the dispatch holder 32 to its first or load position of FIG. 3A.

Figure 3C:
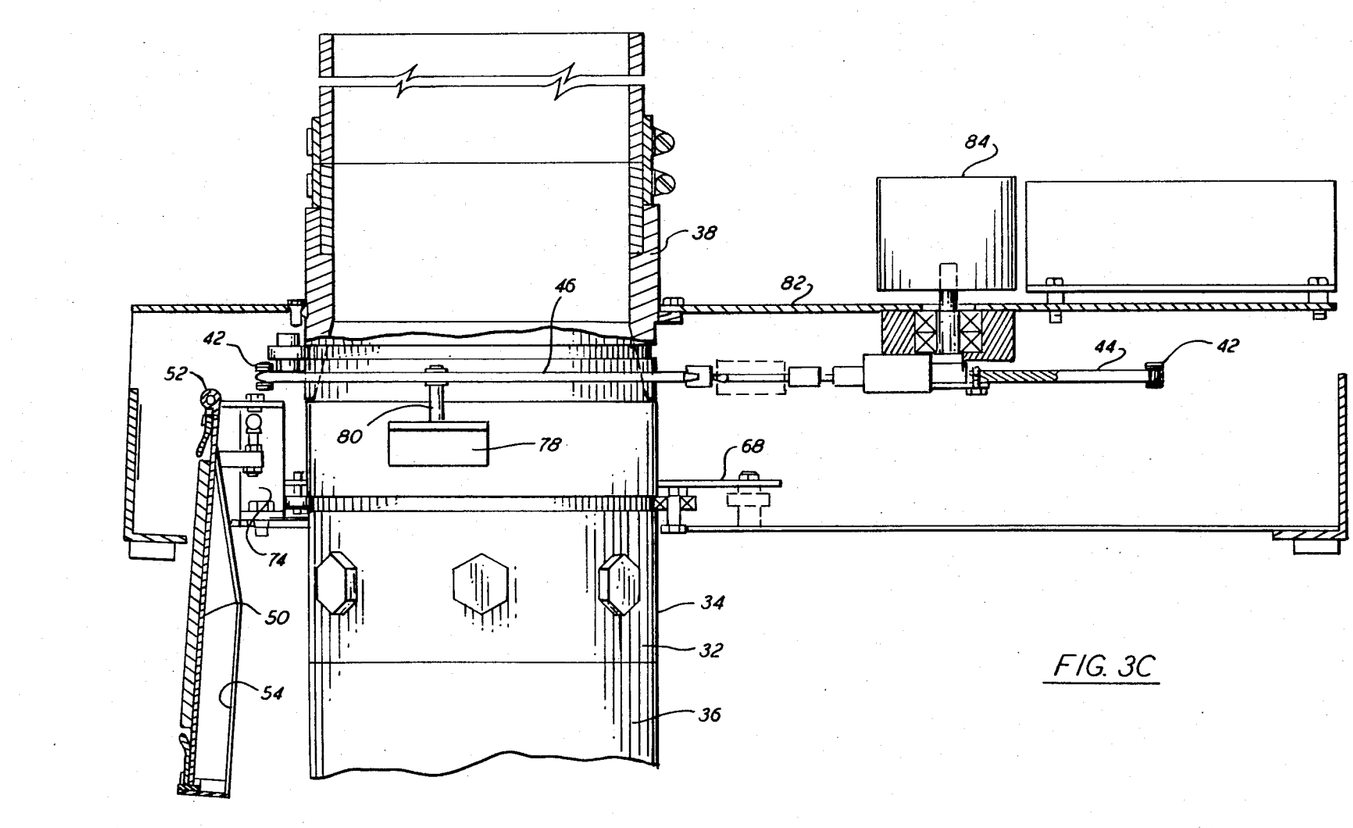
Figure 4:
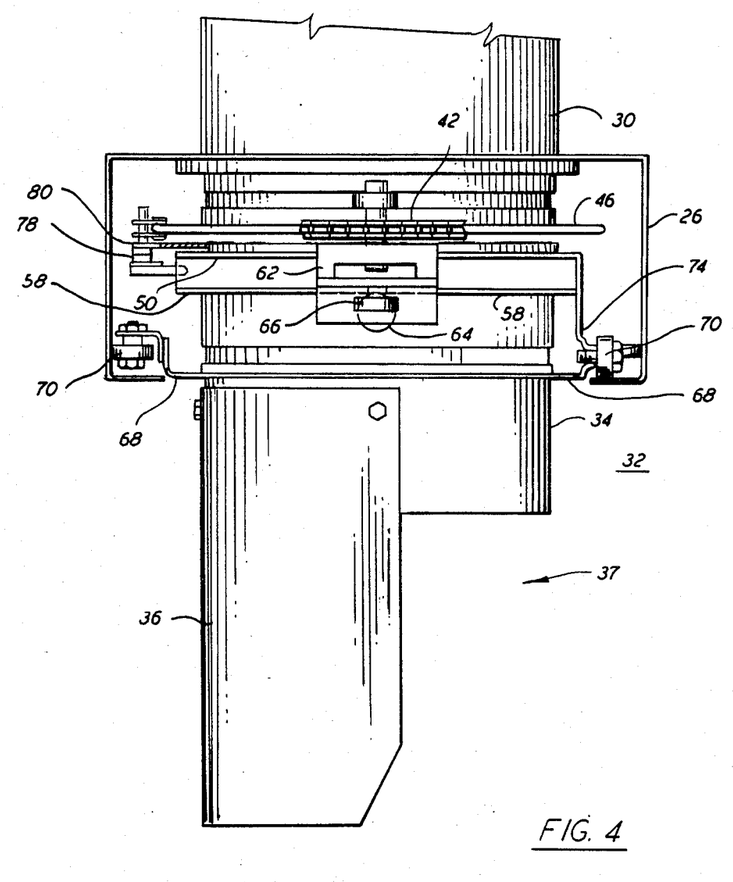
FIG. 4 is an end elevational view of pertinent parts of the preferred embodiment of this invention.

Depending on design considerations, the chain can operate continuously in a single direction, or can be reversed when the FIG. 3C position has been reached to return the elements back to the FIG. 3A position. A plurality of micro-switches (not shown) can be positioned at locations around the track 78 to detect the presence of the cam wheel 66, so that the control for the terminal 10 will have positive indication of the position and condition of the dispatch holder 32 and the clapper valve 50. Also, an optical or mechanical sensor device within the tube 30 or the guide member 38 can sense the presence of a received pneumatic carrier C, and actuate the motor 84 to move the chain 42 to the FIG. 3B position to open the clapper valve 50 for ejection of the received carrier C into the bin 24. In such case, if there is no carrier C to be transmitted to a distant station 10, the motor 84 can be reversed, and the send and receive mechanism is returned to the FIG. 3A position, without going to the FIG. 3C position.

It should be noted that with the construction of this invention, the guide member 38 and the pneumatic tube 30 are made inaccessible for insertion of a carrier C except by use of the dispatch holder 32. Also, because of the construction of the front wall 18, the side wall 16 and the back wall 14, only a single carrier C can be transmitted in a single transmit operation. Further, because the clapper valve 50, when open, hangs on the side of the guide member 38 towards the access opening 20, this structure makes it even more difficult for a carrier C to be inserted inadvertently into the guide member 38 by an operator who may be unfamiliar with the transmit apparatus 10 or its operating procedures. Further, because of the rotational feature of the dispatch holder 32, it is not possible to insert a second carrier C into the dispatch holder 32 when the latter is in its second or send position (FIG. 3C), that is when it is beneath the tubular guide member 38. Instead, the operator must wait for the dispatch holder 32 to return to its first (FIG. 3A) position.

The tube 30 and dispatch holder can be dimensioned for any carrier size, but will preferably accommodate 4", 4¼", and 6" diameter carriers.

While the invention has been described in detail with reference to a single preferred embodiment, it should be recognized that the invention is not limited to that embodiment, but that many modifications and variations thereof would be apparent to those of skill in the art without departure from the scope and spirit of this invention, as defined in the appended claims.

We claim:

1. A send and receive terminal for a pneumatic tube system in which generally cylindrical carriers are transferred under air pressure through a carrier tube to or from another terminal in the system, the terminal comprising a housing having an end member with a tubular guide member that opens to an end of said carrier tube, a receive bin for holding received carriers, and a frame supporting said end member and receive bin; said frame having an access opening at one side and a closed wall at an opposite side;

a dispatch holder having an open side for insertion of one of said carriers and an open end for communicating with said tubular guide member;

closure means for closing said tubular guide member while allowing inward air flow, preventing outward airflow and openable to release a received carrier or to insert a carrier to be transmitted;

carriage means carrying said dispatch holder and said closure means between a first position in which said closure means is aligned with said tubular guide member and said dispatch holder is offset from the guide member, and a second position in which said closure means is offset from said tubular guide member and said dispatch holder is aligned with said tubular guide member;

drive means coupled with said closure means, said dispatch holder, and said carriage means for displacing the latter, for opening said closure means, and for rotating said dispatch holder such that when said carriage is in said first position said drive means rotates said dispatch holder to orient said open side thereof away from said access opening and opens said closure means, and then displaces said carriage means with the opened closure means and the rotated dispatch holder, to said second position, and thereafter returns said carraige to said first position, closes said closure means and rotates said dispatch holder to orient its open side towards said access opening; and controller means for selectively controlling said drive means and said pneumatic tube system for effecting the transfer of one of said carriers placed in said dispatch holder to another terminal in said system.

2. A pneumatic tube system send and receive terminal as in claim 1 wherein said drive means includes a drive chain, a sprocket disposed at the position of said dispatch holder in its first position, another sprocket at the position of said tubular guide member, and means for coupling said dispatch holder with a link of said chain to rotate and displace the dispatch holder as said chain travels in a path around said sprockets.

3. A pneumatic tube system send and receive terminal as in claim 2 wherein said closure means includes a hinged clapper valve having a camway thereon, and a cam on said drive chain acting against said camway to open and close said clapper valve in response to movement of said claim.

4. A pneumatic tube system send and receive terminal as in claim 3 wherein said clapper valve includes a door hinged on said carriage, said camway includes a rail member on an underside of said door extending in an arcuate path thereon, and said cam includes a cam wheel mounted with respect to a link on said drive chain and travelling over said cam rail member.

5. A pneumatic tube system send and receive terminal as in claim 4 wherein said hinge is on the side of said door towards said dispatch holder.

6. A pneumatic tube system send and receive terminal as in claim 2 wherein said other sprocket has an open center and is rotationally disposed on said tubular guide member.

7. A pneumatic tube system send and receive terminal as in claim 1 wherein said roof includes at least one rail supporting said carriage for travel thereon.

8. A pneumatic tube system send and receive terminal as in claim 7 further including rollers on said carriage providing rolling contact with said at least one rail.

9. A pneumatic tube system send and receive terminal as in claim 1 wherein said housing includes a shroud covering the front and side of the terminal at the position of said tubular guide member and the back of the terminal, and being open at the side and front of the terminal at the first position of said dispatch holder.

10. A pneumatic tube system send and receive terminal as in claim 1 wherein said dispatch holder is generally cylindrical in shape and is dimensioned to hold a single one of said carriers.

11. A pneumatic tube system send and receive terminal as in claim 10 wherein said dispatch holder has a generally top and a part-cylindrical shroud mounted on said tubular top.

* * * * *